(12) United States Patent
Kraft et al.

(10) Patent No.: US 8,195,725 B2
(45) Date of Patent: Jun. 5, 2012

(54) ELECTRONIC DEVICE AND METHOD THEREFOR

(75) Inventors: Christian Kraft, Frederiksberg C (DK); Peter Dam Nielsen, Lyngby (DK); Romel Amineh, KBH V (DK); Johanna Bryman, Malmo (SE)

(73) Assignee: Nokia Corporation, Espoo (FI)

( * ) Notice: Subject to any disclaimer, the term of this patent is extended or adjusted under 35 U.S.C. 154(b) by 1174 days.

(21) Appl. No.: 11/402,282

(22) Filed: Apr. 11, 2006

(65) Prior Publication Data

US 2007/0239654 A1    Oct. 11, 2007

(51) Int. Cl.
*G06F 17/00* (2006.01)
(52) U.S. Cl. ......... 707/916; 707/792; 707/793; 707/917
(58) Field of Classification Search .................. 707/792, 707/795, 913, 916
See application file for complete search history.

(56) References Cited

U.S. PATENT DOCUMENTS

| 2002/0032019 | A1  | 3/2002  | Marks et al. |
| 2002/0041692 | A1  | 4/2002  | Seto et al. |
| 2003/0164844 | A1* | 9/2003  | Kravitz et al. ............... 345/700 |
| 2004/0131333 | A1  | 7/2004  | Fung et al. |
| 2004/0199491 | A1* | 10/2004 | Bhatt ............................... 707/2 |
| 2006/0059535 | A1  | 3/2006  | D'Avello |

FOREIGN PATENT DOCUMENTS

EP    1 162 621 A1    12/2001

OTHER PUBLICATIONS

International Search Report/Written Opinion, PCT/EP2007/003071; Nov. 19, 2007; 10 pages.

* cited by examiner

*Primary Examiner* — Sana Al Hashemi
(74) *Attorney, Agent, or Firm* — Alston & Bird LLP

(57) ABSTRACT

An electronic device comprises a user communication interface, a memory for storing music tracks, a music player capable of playing back the music tracks, and a processor provided for measuring, for each of the music tracks, how many times the music track is played back and how long time the music track is played back each time; calculating a parameter value for each of the music tracks based on how many times the music track is played back and how long time the music track is played back each time; and creating a play list of music tracks based on the parameter values.

18 Claims, 3 Drawing Sheets

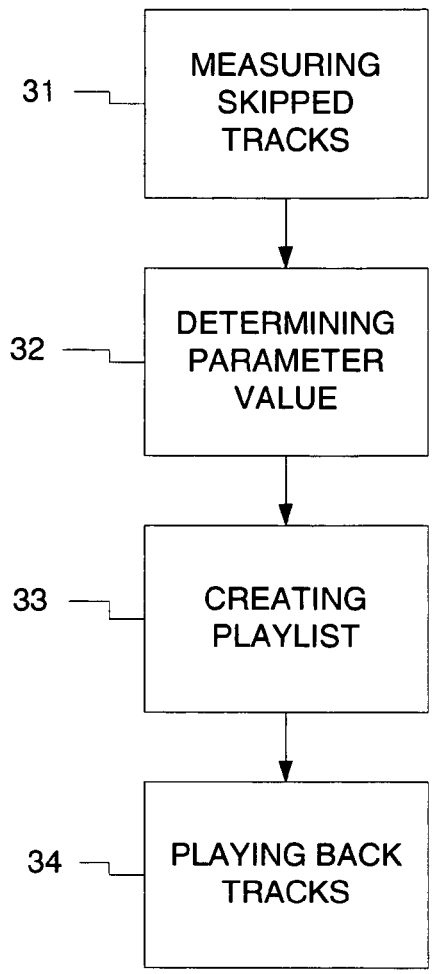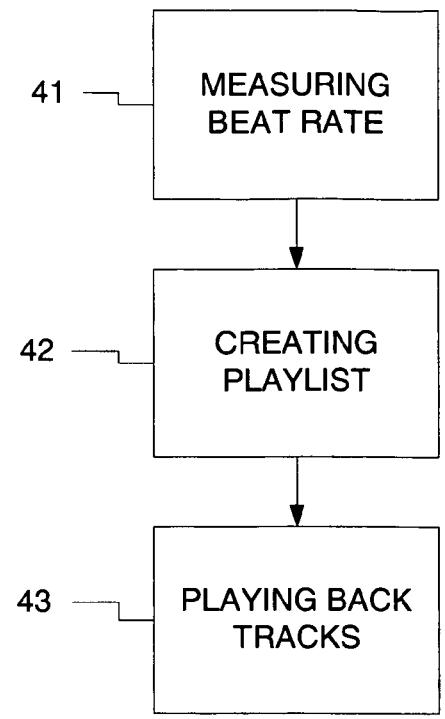
Fig 3
Fig 4

ELECTRONIC DEVICE AND METHOD THEREFOR

FIELD

The disclosed embodiments relate to an electronic device comprising a music player capable of playing back music tracks, and to a method for creating a play list of music tracks therein.

DESCRIPTION OF RELATED ART AND BACKGROUND

The portable music player market is growing every year, and music players and radio tuners have become available in many hand-portable telephones.

Users tend to store more and more music tracks in their devices and the need for better management of these music tracks is becoming increasingly important.

Many portable music players offer the possibility to define play lists, to assign different ratings to the music tracks, etc., but such preferences may be cumbersome to implement in hand-portable telephones due to these device's small displays and keypads. Hence, there is a need for automatically assisting the user in managing the music tracks stored in his/her device.

SUMMARY

In one aspect an electronic device comprises a music player capable of playing back music tracks, which provides for a sophisticated manner of managing music tracks stored in a memory of the device and/or played back on the music player.

In one embodiment the device is configured to form play lists of music.

In another aspect, the device can be configured to allow the user to more proactively listen to his/her favorite music only.

It is still a further aspect to one embodiment of the device further comprises a radio tuner, by which device the user may automatically swap back and forth from radio listening to local music playing depending on the user's favorite preferences.

It is yet a further aspect, an embodiment of the device is flexible, fast, efficient, user-friendly, and of reasonable cost.

It is yet a further aspect of the invention, the device is configured so that favorite music tracks are easier found and played.

According to a first aspect of the invention there is provided an electronic device and a method for creating a play list of music tracks therein. For each of the music tracks stored in the electronic device, it is measured how many times the music track is played back by a music player of the device during a given period of time and how long time the music track is played back each time. A parameter value is calculated for each of the music tracks based on how many times the music track is played back during the given period of time and how long time the music track is played back each time. Finally, a play list of music tracks is created based on the calculated parameter values.

Preferably, the parameter value for a given music track is higher the more times the music track is played back during the given period of time and the longer time the music track is played back each time, wherein the play list of music tracks is formed by adding to the play list music tracks that have the highest calculated parameter values.

According to a second aspect of the invention there is provided an electronic device and a method for creating a play list of music tracks therein. A beat rate of each of the music tracks that is played back on a music player of the electronic device is measured, and a play list of music tracks is created based on the measured beat rates.

According to a third aspect of the invention there is provided an electronic device and a method for creating a play list of music tracks therein. The device comprises a memory that stores music tracks, a music player capable of playing back the stored music tracks, and a radio tuner capable of receiving music tracks and information about each of the music tracks that are, or are in the near future to be, broadcast from a plurality of radio stations. According to the invention a play list of music tracks is capable of being created, wherein the play list comprises music tracks stored in the memory and music tracks that are currently being, or are in the near future to be, broadcast by the radio stations.

Play lists may be created in novel and intelligent manners, which will facilitate the management of the music tracks stored in a memory and received as streamed media, e.g. as a broadcast media. Music tracks that are preferred in any sense may easily be retrieved via the play lists.

Further, play lists can be linked to the mood of the listener and/or to an activity being performed by the listener.

Further characteristics of the invention and advantages thereof will be evident from the following detailed description of embodiments of the invention and the accompanying FIGS. 1-5, which are given by way of illustration only, and thus are not limitative of the present invention.

BRIEF DESCRIPTION OF THE DRAWINGS

FIGS. 3-5 are each a flow chart of a method as performed in the electronic device of FIG. 1 according to a respective embodiment of the present invention.

DETAILED DESCRIPTION OF EMBODIMENTS

Figure 1:
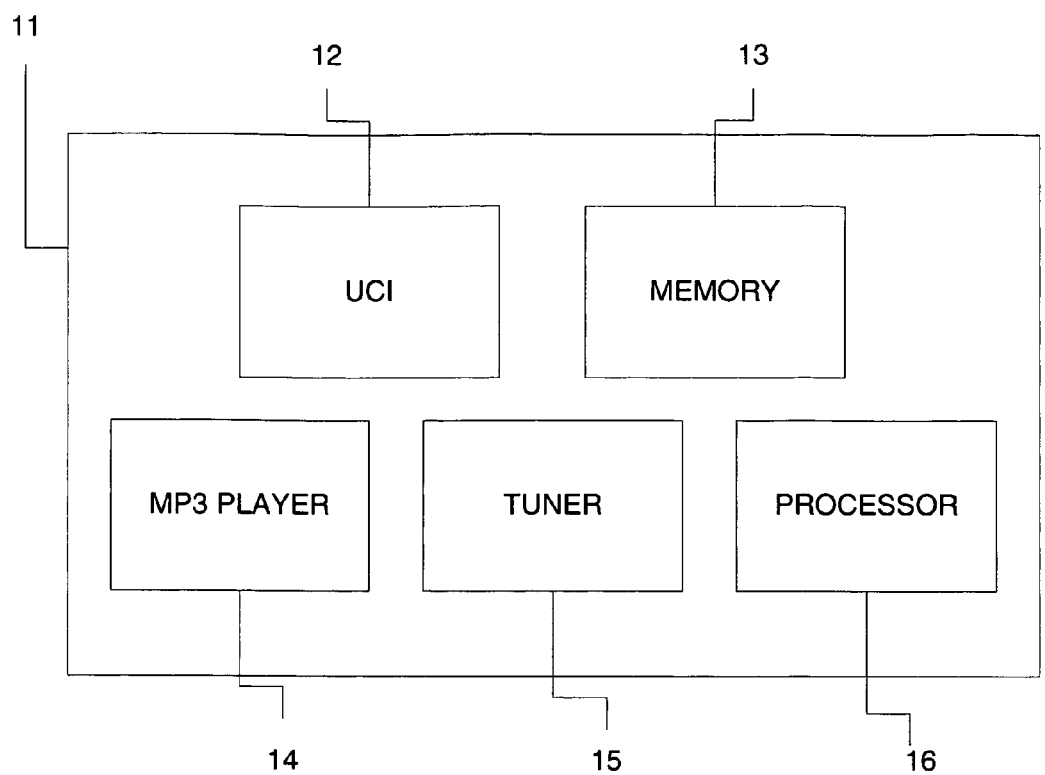
FIG. 1 illustrates, schematically, in a block diagram an electronic device comprising a music player capable of playing back music tracks according to an embodiment of the invention.

An electronic device 11 according to an embodiment of the invention is illustrated in FIG. 1 and comprises a user communication interface 12, a memory 13, a music player 14, optionally a radio tuner 15, and a processor 16.

The communication interface 12 comprises preferably a keypad or similar, a display unit or screen, and a loudspeaker or a headphone.

The memory 13 is inter alia provided for storing digital music tracks, such as mp3 and wma music tracks, and information about each of the stored music tracks, where the information at least comprises a title of, and a name of an artist or music group on, each of the music tracks.

The music player 14, which is preferably entirely software implemented, is capable of playing back the music tracks stored in the memory. It may also be capable of creating a number of play lists, which is common among prior art music players.

The optional radio tuner 15 is capable of receiving music tracks and other broadcast media content, and information about each of the music tracks from a plurality of radio stations. Preferably, the radio tuner is an RDS or RBDS radio tuner. The information comprises at least a title of, and a name of an artist or music group on, each of the music tracks received by the radio tuner 15.

The processor 16 is provided for receiving commands from a user of the device 11, and for controlling the various components of the device 11.

Figure 2:
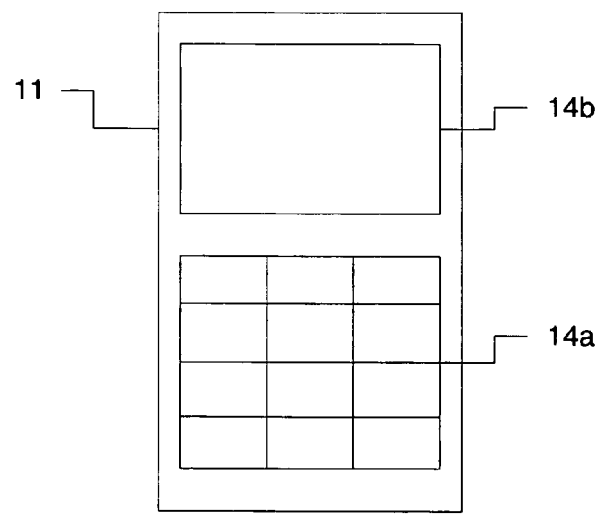
FIG. 2 illustrates, schematically, an exemplary embodiment of the electronic device of FIG. 1.

In one embodiment, as being illustrated in FIG. 2, the device 11 is a hand-portable telephone, such as a mobile phone. Such a device may typically comprise a keypad 14a and a joystick or similar for input of commands from the user of the device. Optionally, the phone is provided for receiving voice commands or has a touch sensitive screen. Further, a display unit 14b, a loudspeaker and/or a headphone, and optionally vibration means may be provided for outputting information and alerts to the user.

The device 11 is provided to offer entirely new methods for accessing music tracks and for music listening. The methods, which will be described in the following, are preferably carried out by means of software loadable into the memory 13 of the device 11 and run by the processor 16. The software may be provided on a storage medium such as a DVD, or it may be downloadable from the Internet, e.g. from the Nokia website.

Thus, a method as performed by the electronic device of FIG. 1 according to a first embodiment of the invention will be described with reference to the flow chart of FIG. 3. The method is referred to as a method for creating a play list of music tracks based on a user's skipping of played back music tracks.

For each music track stored in the memory 13 it is, in a step 31, measured how many times the music track is played back during a given period of time and how long time the music track is played back each time.

Next, a parameter value for each of the music tracks is, in a step 32, calculated based on how many times the music track is played back during the given period of time and how long time the music track is played back each time. The parameter value may be calculated in a number of manners. Typically, a music track that is played back for very short period of time before being skipped renders a low parameter value, whereas a music track that is most often played back in its entirety renders a high parameter value. Further, a music track that is played back many times renders a high parameter value, whereas a music track that is typically never played back renders a low parameter value.

Then, a play list is, in a step 33, created based on the calculated parameter values. Typically, the play list of music tracks is formed by adding music tracks that have the highest calculated parameter values on an absolute scale (i.e. the play list may be short or long) or relative to the calculated parameter values of all music tracks (i.e. the play list may be formed at each instant by e.g. the 30 or 40 music tracks that have the highest parameter values).

Additionally, several play lists may be created, wherein the different play lists may comprise music tracks having similar parameter values or a first play list is created with the music tracks having the highest parameter values, a second play list is created with the music tracks having the second highest parameter values, etc.

Finally, music tracks are, in a step 34, automatically, or upon a user selection being made, played back from the play list by the music player 14.

Further, a parameter value may be calculated for each of the music tracks and for each of a selected plurality of time frames or periods, wherein a play list of music tracks is created for each time frame based on the calculated parameter values for the music tracks for that time frame. The time frames may be defined as different times on the day, different days in the week, different seasons of the year, or a combination thereof.

By such provision music tracks may be played back from a play list for a time frame, in which the user currently is. For instance, if the user behavior indicates that fast music tracks are rarely played in the mornings and/or are often skipped before being played to their end, a play list of slow music tracks is being proposed to the user in the morning, or music tracks of the play list of slow music tracks are automatically played back in the morning. Similarly, if the user behavior indicates that dance music tracks are often played in the week ends and/or are almost never ever ended before being played to their end, a play list of dance music tracks is being proposed to the user in the week ends, or music tracks of the play list with dance music tracks are automatically played back in the week ends.

Next, with reference to the flow chart of FIG. 4, a method as performed by the electronic device 11 of FIG. 1 according to a second embodiment of the invention will be described. This method is referred to as a method for creating a play list to be used for playing back music tracks depending on a current mood of the user or depending on an activity performed by the user.

A beat rate of each of the music tracks that is played back on the music player 14 of the electronic device is, in a step 41, measured. For instance, the beat rate may be measure during a short period of time during one or several occasions during play back, and an average beat rate may be calculated.

Next, a play list of music tracks is, in a step 42, created based on the measured beat rates. For instance, a play list may be created from the music tracks that have the highest beat rates, another play list may be created from the music tracks that have the second highest beat rates, and so forth until finally a last play list may be created from the music tracks that have the lowest beat rates.

Finally, music tracks are, in a step 43, played back from a selected one of the play lists or from a single play list based on beat rates.

Another play list of music tracks may be formed from music tracks that have different beat rates, and then the music tracks from that play list may be played back by firstly playing back music tracks having lower beat rates and then playing back music tracks having higher beat rates. The music tracks in the play list may in fact be arranged in an order of monotonously increasing or monotonously decreasing beat rates whereupon the music tracks from the play list are played back in that arranged order.

Also this embodiment may be modified so that different play lists are created for different time frames, e.g. different times of the day, different days in the week, etc.

Further, the electronic device 11 may be connected to a device for measuring heart beats, e.g. a pulsometer or a pulse watch and adapted to receive a heart beat rate of a user of the device, and for playing back music tracks of a given beat rate depending on the heart beat rate, e.g. music tracks of a beat rate similar to the heart beat rate. By such measures, slower music tracks can be played back when the pulse is low, and faster music tracks can be played back when the pulse is high.

Figure 5:
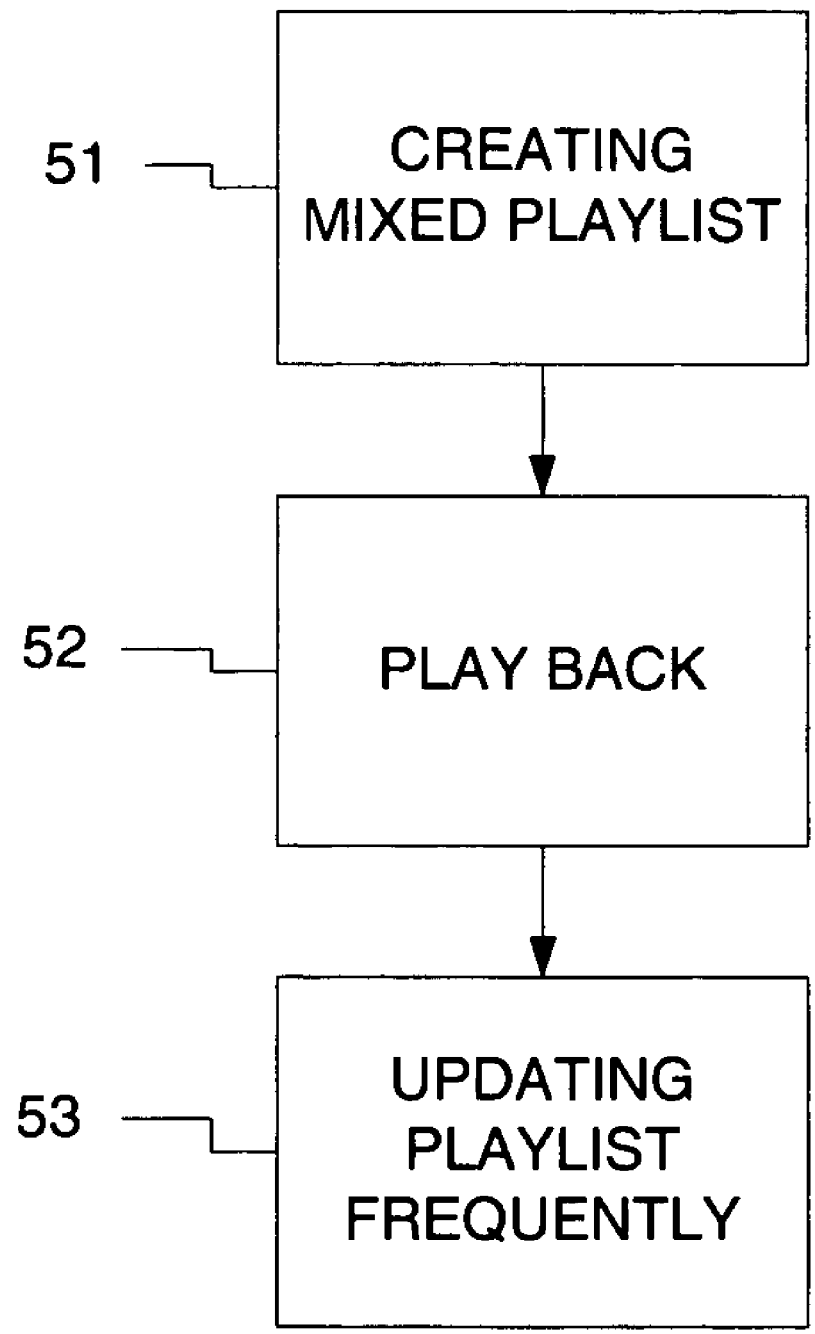

Finally, with reference to the flow chart of FIG. 5, a method as performed by the electronic device 11 of FIG. 1 according to a third embodiment of the invention will be described. This method is referred to as a method for creating a common play list for multiple multimedia sources or players.

This embodiment presumes that the electronic device 11 is equipped with the radio tuner 15. A play list of music tracks comprising music tracks stored in the memory 13 and music tracks that are currently being, or are in the near future to be, broadcast by the radio stations is, in a step 51, created. The play list of music tracks may be created from another list of music tracks, e.g. from a list of favorite music tracks or artists, a list of recently played music tracks or artists, or any other kind of play list of music tracks.

Next, music tracks from the play list are, in a step 52, alternately played back and received (by tuning the radio tuner to an appropriate radio station) depending on whether the music track is available from the memory 13 or on the radio. Since the music tracks that are broadcast from the radio stations terminate rather quickly, the play list is, in a step 53, updated frequently, i.e. music tracks that are currently being, or are in the near future to be, broadcast by the radio stations are added and music tracks that are not any longer broadcast by the radio stations are removed from the play list.

According to one variant of this embodiment, a music track from the play list is played back or received from a radio station. When a given time is left, or has passed, of the played back or received music track the play list is automatically updated (i.e. music tracks that are currently being, or are in the near future to be, broadcast by the radio stations are added to the play list and music tracks that are not any longer broadcast by the radio stations are removed from the play list). Next, the radio tuner is automatically tuned to a radio station that is broadcasting a music track comprised in the play list depending on a time period the music track has been broadcast or depending on a priority of the broadcast music track, but if no music track from the play list that has been broadcast shorter than a given time period or that has a priority above a given priority exists, a music track from the play list that is stored in the memory is automatically played back instead.

According to one variant of this embodiment, a music track from the play list is played back or received from a radio station, wherein, before the end of the played back or received music track, the played back or received music track is faded out, and another music track from the play list is played back or received from a radio station.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A device comprising:
a memory for storing music tracks; and
a processor provided for:
measuring a beat rate of each of the music tracks that is stored by the memory and played back on a music player;
creating a play list of music tracks based on said measured beat rate;
receiving from a heart beat meter a heart beat rate of a user of the device; and
playing back music tracks of a given beat rate depending on the heart beat rate.

2. A method comprising:
measuring a beat rate of each of a plurality of music tracks that is played back on a music player;
creating said play list of music tracks based on said measured beat rates;
receiving a heart beat rate of a user of the device; and
playing back music tracks of a given beat rate depending on the heart beat rate.

3. A device comprising:
a memory for storing music tracks; and
a processor provided for measuring a beat rate of each of the music tracks that is stored by the memory; and creating a play list of music tracks based on said measured beat rates;
wherein said processor is provided for creating a play list of music tracks for each of a selected plurality of time frames based on said beat rate for each of the music tracks; and
wherein said processor is provided for receiving from a heart beat meter a heart beat rate of a user of the device, and for playing back music tracks of a given beat rate depending on the heart beat rate.

4. A computer program product comprising at least one computer-readable storage medium having computer-executable program code instructions stored therein, the computer-executable program code instructions comprising:
program code instructions for storing music tracks in a memory;
program code instructions for measuring a beat rate of each of the music tracks that is stored in the memory;
program code instructions for creating a play list of music tracks based on said measured beat rates;
program code instructions for receiving a heart beat rate of a user of the device; and
program code instructions for playing back music tracks of a given beat rate depending on the heart beat rate.

5. The device of claim 1 wherein said processor is provided for creating said play list of music tracks by adding to the play list music tracks that have the highest beat rates, and for creating another play list by adding to the another play list music tracks that have the lowest beat rates.

6. The device of claim 1 wherein said processor is provided for automatically playing back music tracks from said play list.

7. The device of claim 1 wherein said processor is provided for creating said play list of music tracks by adding music tracks that have different beat rates to the play list, and for playing back music tracks from said play list by firstly playing back music tracks having lower beat rates and then playing back music tracks having higher beat rates.

8. The device of claim 1 wherein said processor is provided for arranging the music tracks in said play list in an order based on their beat rates and for playing back the music tracks from said play list in said order.

9. The device of claim 1 wherein said processor is provided for retrieving a time frame among the selected plurality of time frames based on the actual time and/or day, and for automatically playing back music tracks from the play list for the retrieved time frame.

10. The device of claim 1 wherein said electronic device is a hand-portable telephone.

11. The device of claim 1, wherein creating said play list of music tracks based on said measured beat rates comprises creating said play list of music tracks for each of a plurality of time frames based on said measured beat rates.

12. A computer program product loadable into the internal memory of a computer-based device and comprising software code portions for carrying out the method of claim 2 when said product is run on said device.

13. The method of claim 2, wherein creating said play list of music tracks based on said measured beat rates comprises creating said play list of music tracks for each of a plurality of time frames based on said measured beat rates.

14. The computer program product of claim 4, wherein said program code instructions for creating a play list of music tracks based on said measured beat rates comprises program code instructions for creating a play list of music tracks for each of a selected plurality of time frames based on said beat rate for each of the music tracks.

15. The computer program product of claim 4, wherein said plurality of time frames comprises different times of the day, different days of the week, or a combination thereof.

16. The device of claim 11 wherein said plurality of time frames comprises different times of the day, different days of the week, or a combination thereof.

17. The computer program product of claim 12 which is downloadable from the Internet.

18. The method of claim 13, wherein said plurality of time frames comprises different times of the day, different days of the week, or a combination thereof.

* * * * *